(12) United States Patent
Maltaverne et al.

(10) Patent No.: US 8,485,595 B2
(45) Date of Patent: Jul. 16, 2013

(54) DEVICE FOR CLOSING OFF AN OPENING PREPARED IN THE ROOF OF A VEHICLE, PROVIDED WITH A SEALING BARRIER AND A DRAIN FOR DRAINING WATER TOWARDS THE EXTERIOR

(75) Inventors: Guy Maltaverne, Bressuire (FR); Jean-Claude Neaux, Terves (FR); Régis Leboeuf, Les Landes Genusson (FR)

(73) Assignee: Advanced Comfort Systems France SAS-ACS France, Bressuire Cedex (FR)

( * ) Notice: Subject to any disclaimer, the term of this patent is extended or adjusted under 35 U.S.C. 154(b) by 0 days.

(21) Appl. No.: 13/497,662

(22) PCT Filed: Jul. 2, 2010

(86) PCT No.: PCT/EP2010/059509
§ 371 (c)(1),
(2), (4) Date: Jun. 4, 2012

(87) PCT Pub. No.: WO2011/045092
PCT Pub. Date: Apr. 21, 2011

(65) Prior Publication Data
US 2012/0228900 A1    Sep. 13, 2012

(30) Foreign Application Priority Data
Sep. 23, 2009 (EP) .................................. 09305888

(51) Int. Cl.
*B60J 7/04*    (2006.01)
(52) U.S. Cl.
USPC ..................................... 296/213; 296/216.06
(58) Field of Classification Search
USPC ................. 296/216.06–216.08, 213
See application file for complete search history.

(56) References Cited

U.S. PATENT DOCUMENTS

| | | | |
|---|---|---|---|
| 1,718,183 A * | 6/1929 | Taylor ........................ | 160/368.1 |
| 4,911,497 A | 3/1990 | Schreiter et al. | |
| 4,934,098 A * | 6/1990 | Prouteau et al. ................ | 49/214 |
| 2010/0084894 A1 | 4/2010 | Billy et al. | |

FOREIGN PATENT DOCUMENTS

| EP | 0331910 A2 | 2/1989 |
|---|---|---|
| WO | 2008068325 A1 | 6/2008 |

OTHER PUBLICATIONS

International Search Report dated Aug. 5, 2010 for corresponding International Application No. PCT/EP2010/059509, filed Jul. 2, 2010.
International Preliminary Report on Patentability and Written Opinion dated Mar. 27, 2012 for corresponding International Application No. PCT/EP2010/059509, filed Jul. 2, 2010.

\* cited by examiner

*Primary Examiner* — Dennis Pedder
(74) *Attorney, Agent, or Firm* — Pauly, Devries Smith & Deffner, L.L.C.

(57) ABSTRACT

A device is provided for blocking an opening formed in an automobile roof, including a fixed glass portion to be rigidly connected to the vehicle and at least one glass panel. The glass panel is mobile relative to the fixed portion between a blocking position, in which it blocks an opening in the fixed portion, and at least one open position, in which the opening is at least partially open. Each of the mobile panels is slidingly guided along two rails rigidly connected to the surface of the fixed portion. The device also includes at least one passage for collecting and draining at least a portion of the water received on the outer surface of the mobile panel toward the outside of the vehicle. The passage is rigidly connected to the mobile panel to enable the water to flow from the mobile panel toward one of the rails.

12 Claims, 4 Drawing Sheets

Coupe A-A

Coupe D-D

DEVICE FOR CLOSING OFF AN OPENING PREPARED IN THE ROOF OF A VEHICLE, PROVIDED WITH A SEALING BARRIER AND A DRAIN FOR DRAINING WATER TOWARDS THE EXTERIOR

CROSS-REFERENCE TO RELATED APPLICATIONS

This Application is a Section 371 National Stage Application of International Application No. PCT/EP2010/059509, filed Jul. 2, 2010, which is incorporated by reference in its entirety and published as WO 2011/045092 on Apr. 21, 2011, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of the roofs of motor vehicles. More specifically, the disclosure pertains to window-fitted or glazed roofs comprising at least one aperture working with a sliding, movable glass panel or glazed panel.

In the framework of the present application, the term "glazed panel" refers to any substantially transparent or translucent (fixed or movable) panel contributing to the window surface allowing light transmission, made out of glass or any other appropriate material such as polycarbonate. The edges of the panel may be opacified, for example by screen printing. In certain embodiments, the panel may be constituted by several flush elements, seen from the exterior, and where applicable at least one of these elements may be opaque and, for example, made of metal.

A device according to the disclosure can furthermore be fitted into an opening formed in a substantially horizontal portion of the body of the vehicle, other than the roof.

BACKGROUND OF THE DISCLOSURE

The current trend, in terms of motor vehicles, whether entailing automobiles, utility vehicles, trucks or buses, is to offer increasing amounts of glazed surfaces. Thus, in particular, vehicles have been proposed having a roof equipped with one or more glazed elements. In certain cases, the entire roof is made of glass or of a similar material allowing sunlight to pass through.

In order to increase the window surface allowing light transmission, it has also been sought to propose large-sized glazed surfaces while minimizing the number of glazed panels of the roof. For example, the rear window or the windscreen can be located in the extension of the glazed roof in order to provide for a visual appearance of continuity (without any visible and protruding frame or separating strut, seen from the exterior even if, in practice, they correspond to distinct glazed elements).

It has also been necessary to take account of the fact that these glazed surfaces have to be incorporated into the roofs of present-day or future vehicles which have streamlined shapes that are generally non-plane and are most frequently incurvated or rounded widthwise and also sometimes lengthwise.

Besides, solutions have been proposed to make apertures in the roof especially to be able to form a sunroof module.

Thus, a widespread technique for releasing an aperture in the roof consists in tilting a movable window glass element mounted on a frame towards the exterior of the vehicle around an axis attached to the plane of the roof, in order to release a passage between the window glass element and the frame.

This technique has the drawback of allowing for only a half opening of the roof in order to prevent it from being pulled away under the effect of aerodynamic pressure and of being capable of implementation only for small-sized windows glasses.

Another sunroof technique also used conventionally consists in making the window glass movable above or below the roof in a plane substantially parallel to the plane of the roof. There is thus a first known technique for a roof pierced with an aperture that can be closed off by a sliding glazed panel housed in the lining of the roof. One drawback of this technique is that the dimensions of the apertures in the roof and therefore in the glazed surfaces enabling them to be closed off are limited.

One problem common to these sunroof techniques is that water, for example in the form of drops of condensation or rain, can penetrate the car interior space when the movable glass window or the sliding panel at least partially releases the aperture formed in the roof.

To cope with this problem, it has been proposed to equip the contour of the movable window glass with a peripheral container for recovering water in which the water deposited on the surface of the movable window glass is collected.

One drawback of this technique is that the receptacle may get completely filled and in certain cases overflow. The excess water may then flow into the car interior space through the aperture, which of course is unsatisfactory.

It has been observed especially with these techniques that this drawback is amplified by the fact that the container can be filled above all with water outside periods when the sunroof is open, in other words when the sunroof is closed, which greatly reduces the efficiency of the container.

Another drawback of this technique is the need for the presence of a container for recovering water which reduces the window surface allowing light transmission and/or the permissible size of the opening on the exterior and/or the volume of the car interior space.

Yet another drawback of this technique and other prior-art sunroof techniques is that the elements designed to recover water can lower the aesthetic qualities of the vehicle.

It is also been proposed to drain water towards the exterior of the vehicle.

One drawback of prior-art techniques providing for a draining of water is that they are generally complex to implement, especially when it is necessary to remove water deposited on the sliding glazed panel.

Yet another drawback of the prior-art techniques referred to here above is that, in certain cases, water can stagnate in the water recovery and or draining container, releasing an unpleasant odor.

SUMMARY

An aspect of the present disclosure relates to a device for closing off an opening prepared in the roof of a motor vehicle comprising a glazed fixed part designed to be fixedly joined with said vehicle and at least one glazed panel that is movable relatively to the fixed part between a closing-off position in which it closes off an aperture defined in said fixed part and at least one opening position in which said aperture is at least partially released, each of said movable panels being guided slidingly along two rails fixedly joined to the surface of said fixed part.

An embodiment of the invention thus concerns especially devices of the type described for example in the French patent application FR-2 909 594 by the same applicant as that of the present application, which enables the face turned towards the interior of the movable glazed panel to be made flush with the fixed part and/or this fixed part to be made flush with a body element of the bodywork seen from the exterior of the vehicle.

According to an embodiment of the invention, a closing-off device such as this comprises means for recovering and/or draining at least a portion of the water received on the external surface of said movable panel towards the exterior of said vehicle, said means for recovering and draining water comprising at least one water passage fixedly joined to said movable panel to enable the passage of said water from said movable panel towards one of said rails.

Through an embodiment of the invention, water flowing on the surface of the movable panel will be drained from the movable panel and flow naturally towards the rail or rails, thus eliminating the risk of overflow of excess water affecting the prior-art devices. The passage prepared through the movable panel could take several forms and could for example consist of a single hole opening out into a wall of the panel overhanging the rail or rails. In other embodiments, the passage could be arranged by means of a tube or a groove.

According to one embodiment, particularly advantageous in its simplicity, the means for recovering and draining water comprise at least one passage formed from one side to another of a guiding peg or pin of said movable panel in one of said rails.

This embodiment makes use of pre-existing elements in giving them a flow function that is additional to their initial guiding function and is therefore particularly economical.

Advantageously, said movable panel has a frame configured to enable the flow by gravity of at least one portion of said water towards said passage.

Thus, water is prevented from stagnating on certain parts or cavities of the surface of the movable panel and forming pockets.

According to one advantageous aspect of an embodiment of the invention, said rail has means for guiding water towards at least one of its ends at the front or at the rear of said vehicle.

The drained water can thus be made to splash outwards by the speed of the vehicle without any risk that it will fall back onto the roof and/or the closing-off device.

According to one particular embodiment of the invention, said water-guiding means comprise a draining channel formed in a portion of said rail.

It is thus not necessary to provide for a specific additional element for guiding water other than the rail, thus making the device particularly simple.

Advantageously, the closing-off device comprises means for closing off at least one access to said means for recovering and draining in said closing-off position, configured so as to prevent said draining means from receiving water in said closing-off position.

This approach makes it possible unexpectedly to ensure that the occupants of the vehicle will be protected from the splashing or falling of drops of water deposited on the external surface of the device and especially of the movable panel for example in the event of rain showers, because the device makes it possible to recover and drain this water towards the exterior of the vehicle in every position of opening of the movable panel.

Furthermore, in the closing-off position, the closing of the aperture prevents access to and therefore the filling of the water recovery and draining means which therefore remain fully efficient should the aperture be released. And even when a quantity of residual water unexpectedly penetrates the recovery and draining means, the device of an embodiment of the invention enables it to be drained to the exterior.

According to one advantageous embodiment of the invention, said closing-off means are formed by means for making said aperture tightly sealed when said movable panel is in said closing-off position.

According to one particularly simple approach, these means provide for the closing and tight sealing of the aperture, therefore also preventing the water recovery and draining means from getting filled in the closing-off position.

These means for tightly sealing the opening the device may be for example cords or seals or any other appropriate deformable element making the aperture tightly sealed in the closed-off position whatever the weather conditions and/or conditions of use (drizzling, heavy rain, washing by means of a pressurized stream of water etc).

They can also be constituted in certain particular embodiments of the invention by a valve or any other appropriate hinged element for which the state can be controlled, for example, by means for unlocking the movable panel.

Preferably, said means for making said aperture tightly sealed comprise at least one seal mounted so as to be compressed against the face, pointed towards the interior of the vehicle, of said fixed part in the closed-off position, said accesses to said means for recovering and draining comprising at least one water passage formed in the frame of said movable panel, plugged by said seal when it is compressed.

This seal or these seals may for example have at least two distinct lips to provide for the tight sealing of the aperture and the closing-off of the access to the water draining passage or passages.

According to one particular aspect of an embodiment of the invention, means for recovering and draining water comprise at least one chute element formed by and/or fixedly joined to a frame of said movable panel.

A chute element of this kind which can, for example, take the form of a gutter in at least one particular embodiment of the invention, also makes it possible to collect water on the entire contour of the movable glazed panel or on a portion of it.

In at least one particularly advantageous embodiment of the invention, said chute element at least partially encroaches into the car interior space of said vehicle facing said fixed part.

Thus, the water streaming from the fixed part through the aperture falls into the chute element which enables it to be drained. The chute element therefore provides for an additional function of a sealing "barrier" protecting the car interior space. Furthermore, in the closed-off position, if the sealing obtained is not perfect because for example of migration of water by capillarity, the drops of flowing water can be collected in the chute element in order to be drained.

According to one variant of this mode of implementation, the chute element includes a gutter adjacent to the closing-off means and connected to at least one passage of water prepared through said movable panel.

Such a gutter will enable the recovery of water which will be splashed above the closing-off means and further reinforce the sealing quality.

Preferably, said movable panel has a rounded shape in at least two horizontal directions so as to make said water stream down towards at least one of its edges.

Thus, the water does not collect on the surface of the movable glass panel, thus preventing splashing in the car interior space in the event of tremors and improving visibility through the movable panel.

The An embodiment of the invention also concerns a motor vehicle equipped with one of the closing-off devices as described here above.

BRIEF DESCRIPTION OF THE DRAWINGS

Other features and advantages shall appear more clearly from the following description of a particular embodiment of the invention, given by way of a simple illustratory and non-restrictive example, and from the appended drawings, of which.

DETAILED DESCRIPTION OF ILLUSTRATIVE EMBODIMENTS

1. Reminder of the Principle of an Embodiment of the Invention

As referred to here above, the general principle of an embodiment of the invention therefore relies on the implementation of a draining of water that is deposited on the roof, on the external surface of the movable panel or on that of the fixed part, towards the exterior of the vehicle, as soon as the movable panel is in any opening position and hence as soon as the aperture is released, and solely in this case.

In at least one embodiment of the invention, this novel approach makes it possible especially to form an efficient sealing barrier for the aperture formed in the fixed part and therefore for the car interior space when the movable panel is closed.

2. Example of an Embodiment of the Invention

Here below, we consider a roof of a vehicle formed by a closing-off device according to an embodiment of the invention which is attached to the body of the roof of the vehicle.

Figure 1:
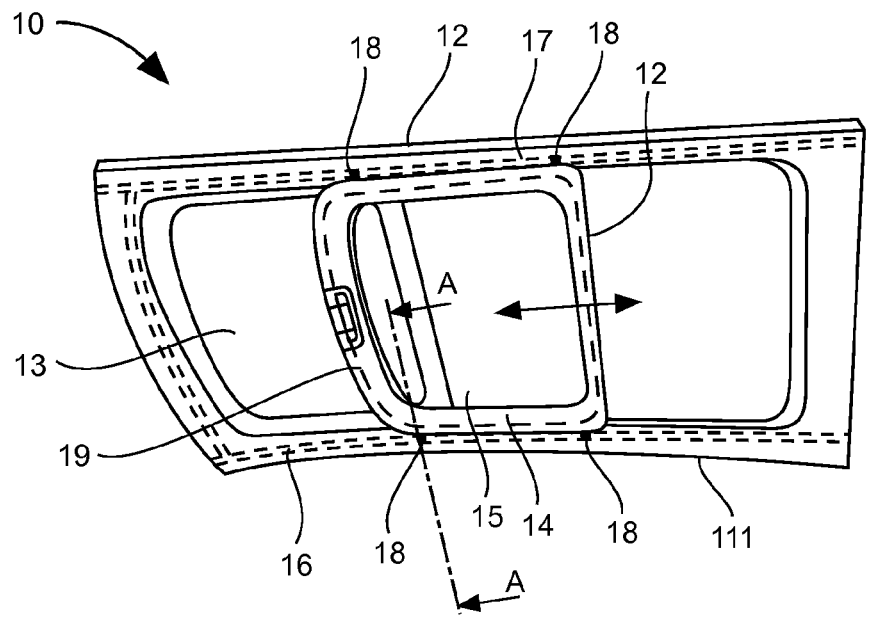
FIG. 1 provides an illustration, in a bottom view in perspective, of one embodiment of a closing-off device according to the an embodiment of forming a roof of a vehicle in a partially closed position.

FIG. 1 is an illustration, in a view in perspective, of one particular embodiment of the invention for which the external outline 111 of the fixed panel 11 of a closing-off device 10 according to an embodiment of the invention is a roof (or at least one part of a roof) designed to be fixedly joined by bonding, in a flush manner, to a receiving edge (not shown) of the sheet-metal roof of the vehicle.

The fixed part is constituted by a one-piece glazed panel 11, for example made of tempered glass or polycarbonate. It is advantageously rounded, in particular to give the roof a shape responding to current criteria of design, comfort and drag, etc.

A movable glazed panel 12 for example made of thermoformed polycarbonate shown in FIG. 1 in a partial opening position enables an aperture 13 formed in the fixed part 11 to be closed.

This movable panel 12 can slide inside the vehicle, beneath the fixed part 11, in a direction or axis of sliding that is substantially horizontal to close off or release the aperture 13. During the closing of the aperture, the movable panel 12 is shifted successively relatively to the fixed part 11:

in the sliding plane, parallel to the plane formed by the fixed part, from the position shown in FIG. 1, where the aperture is partially released, towards a position of release in which the movable panel is substantially facing the aperture and is shifted relatively to the fixed part, and in a swaying motion along a rising curve to enable the passage of the movable panel from the release position to a closing-off position wherein the movable panel is in the same plane as the fixed part, also called a closing-off plane, and closes off the aperture.

The movable panel 12 has a frame 14 within which a window glass is encapsulated. This frame extends on the face of the movable panel that is oriented towards the interior of the vehicle so as to provide for a flush appearance, seen from the exterior. It is guided by two rails 16, 17 bonded to the inner face of the fixed part 11 by means of four guiding pegs 18 which protrude laterally from the frame 14. A cord or seal 19 bonded to the upper face of the frame 14 is designed to provide for tight sealing between the movable panel 12 and the fixed part 11 in the closing-off position and therefore make the aperture 13 tightly sealed.

Figure 2:
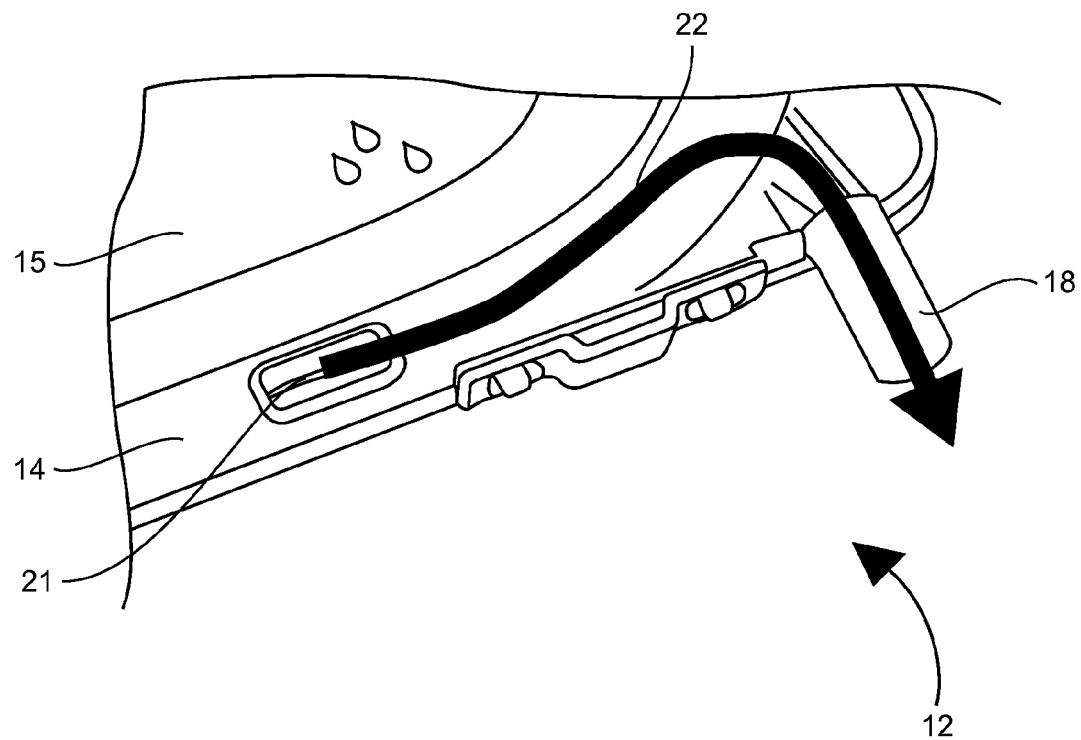
FIG. 2 is a detailed view of a portion of the water draining course incorporated into the movable panel of the device shown in FIG. 1.

As can be seen in FIG. 2, in a detailed view of the movable panel 12, drops of water or traces of moisture that get deposited on the upper (exterior) face of the movable panel 12 can stream down on the window glass 15, which is preferably rounded in two directions for this purpose. This quantity of water is recovered in cavities 21 or containers, formed in the thickness of the frame 14.

In order to drain the water recovered in the cavities 21 to the exterior of the vehicle, chute elements 22 are provided communicating with the pegs 18 which are designed to enable the passage of this water. The chute elements 22 are advantageously formed directly in the frame 14. Advantageously, they have a slope designed to enable the gravitational flow of water towards the pegs 18.

In variants of this embodiment, it is also possible to envisage fixedly joining chute elements obtained separately to the frame 14.

Figure 9:
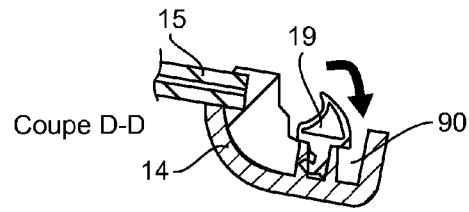
FIG. 9 is a partial view of a movable panel according to one variant of the invention.
Figure 9:
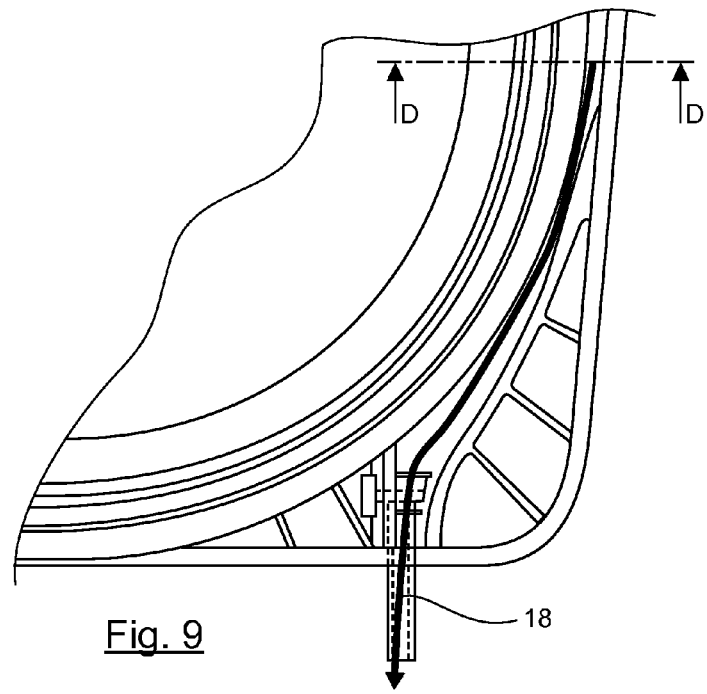

According to another variant shown in FIG. 9, the frame 14 could include a chute element forming a gutter 90 adjacent to the seal 19 and designed to recover water which could be splashed above said seal 19, said gutter being connected to at least one peg 18.

Figure 3:
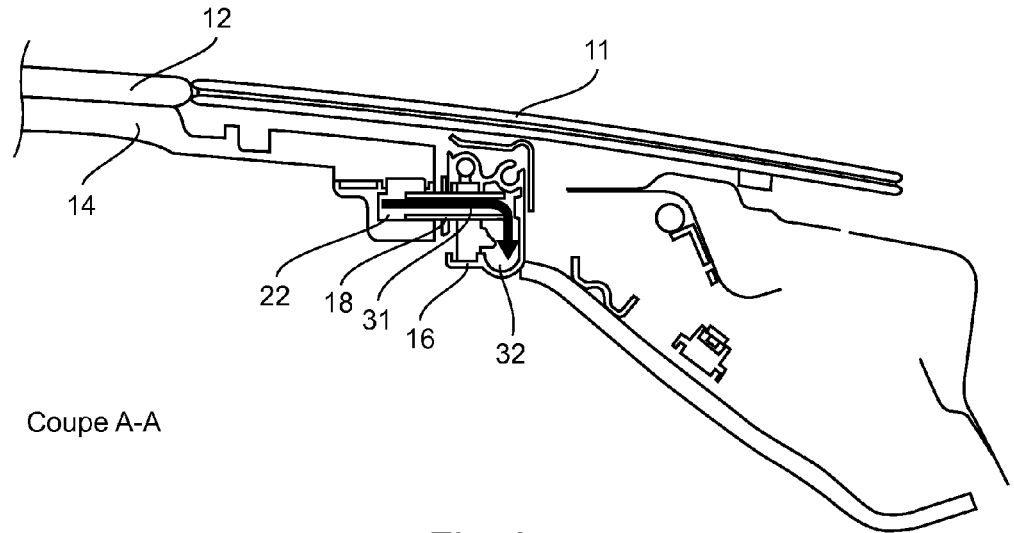
FIG. 3 is a view in vertical section along A-A, at the level of a guiding peg, of the device shown in FIG. 1.

As shall be seen more clearly in FIG. 3, which is a vertical sectional view along A-A (see FIG. 1) of the device 10 taken at the peg 18, each of these pegs 18 (or at least some of them) is therefore pierced from one side to the other of an internal lead-through channel 31, thus enabling the water flowing in the chutes 22 to flow into a draining channel 32 formed in a part of the adjacent rails 16, 17. It must be noted that the draining of water is made possible through the pegs whatever the aperture position (open or closed) occupied by the movable panel.

Figure 4:
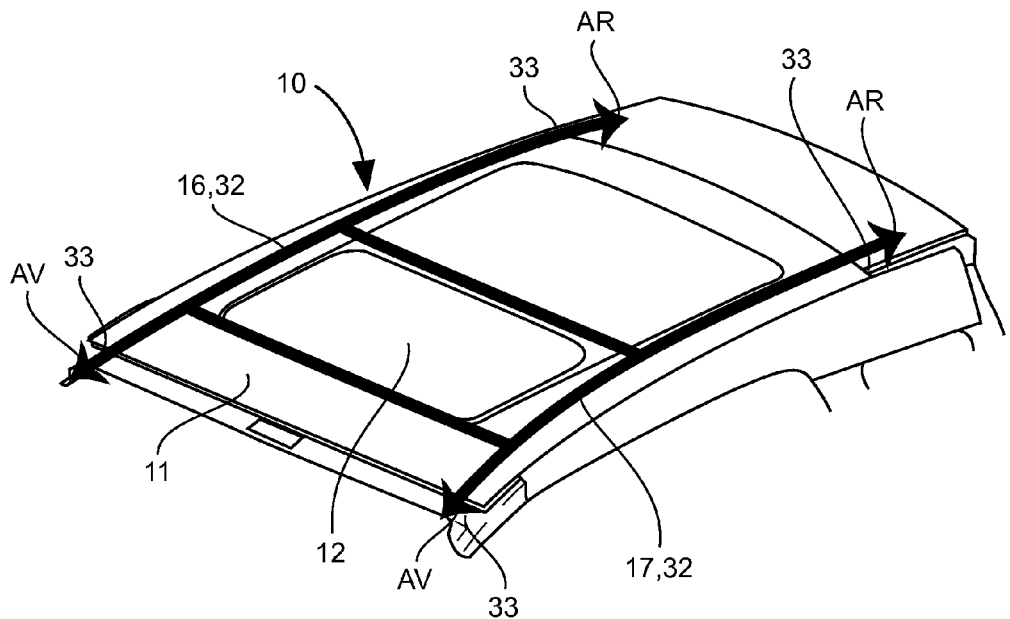
FIG. 4 specifies the water draining path towards the front or the rear relatively to the vehicle, along the roof.

Because of the rounded shape given to the rails 16, 17 to match the shape of the roof, the water will then flow into the channel 32 either towards the front of the vehicle, in the direction indicated by the arrows AV, or else rearwards in the direction indicated by the arrows AR (see FIG. 4), so as to be drained outwards in proximity to the ends of the rails, through holes or vents 33.

It can further be noted in FIG. 3 that the frame 14 has a dimension slightly greater than those of the aperture. This overlapping enables the recovery in the cavity and/or the chute elements of the residual water located in the upper face of the fixed part and liable to fall through the aperture. Thus, a sealing barrier has been made in any open position.

Figure 5:
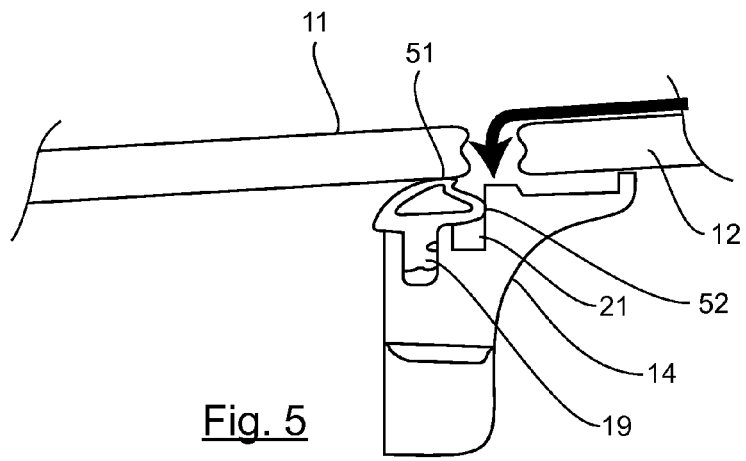
FIG. 5 is a view in section of the zone of the seal fixedly joined to the frame of the movable panel, in the closing-off position, where it is compressed.

FIG. 5 is a partial view (from the left-hand side) in a vertical section of the device illustrated in FIG. 1, after the closing of the aperture.

Thus, as illustrated in FIG. 5, the upper lip 51 of the joint 19 is compressed against the inner face of the fixed part 11 in the closed-off position thus providing for the tight sealing of the aperture 13.

Furthermore, in this closed-off position, the part 52 of the seal 19 which is deformed blocks the access to the cavities 21. Only very small quantities of water can therefore penetrate the water draining route, for example by spreading through or along the seal through the phenomenon of capillarity, thus preventing water from invading this circuit or stagnating in it.

Figure 6:
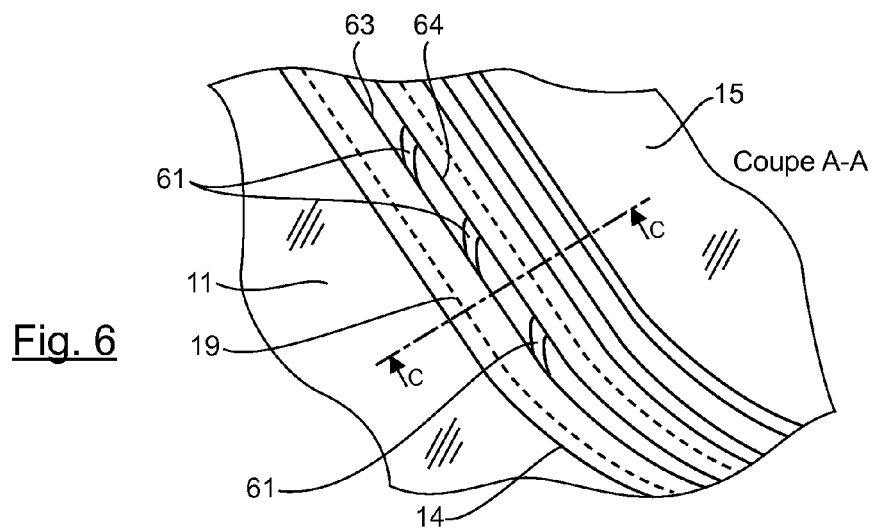
FIGS. 6 and 7 illustrate another embodiment of the invention, enabling access to the water recovery and draining means beneath the means designed to make the aperture tightly sealed.
Figure 7:
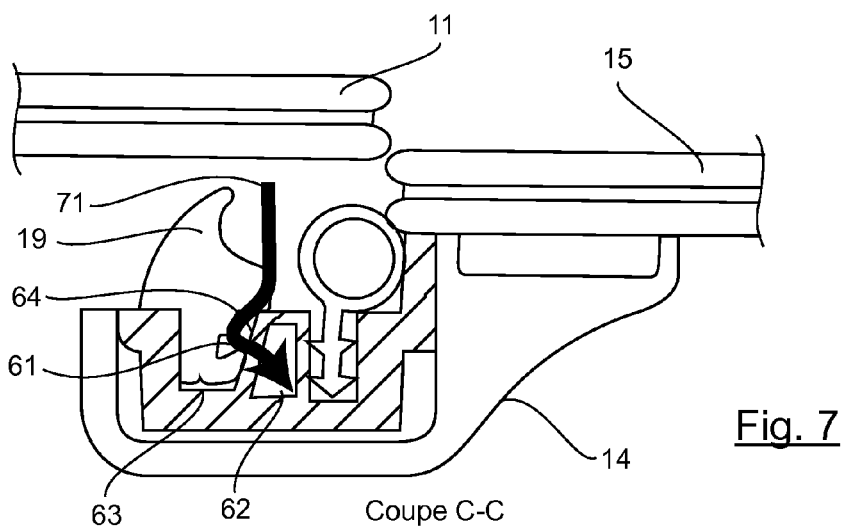

In one variant of this embodiment of the invention, presented with a reference to FIGS. 6 and 7, the access to the water draining chute 62 can be formed by a plurality of holes 61 through a wall 64 of the groove 63 made in the vicinity of the edge of this frame 14 and designed to receive the foot or base of the seal 19 (shown in dashes on this FIG. 6 for greater clarity).

In the closing-off position, the base of the seal 19 is compressed into the groove 63 and blocks the holes 61. In the opening position, when the sliding panel is released from the plane of the aperture, the seal 19 is decompressed and therefore again takes a non-deformed shape. A passage towards the holes 61, illustrated symbolically by the arrow 71 in the vertical cross-section view C-C shown in FIG. 7 is released beneath the seal 19, thus enabling water to be drained.

Figure 8:
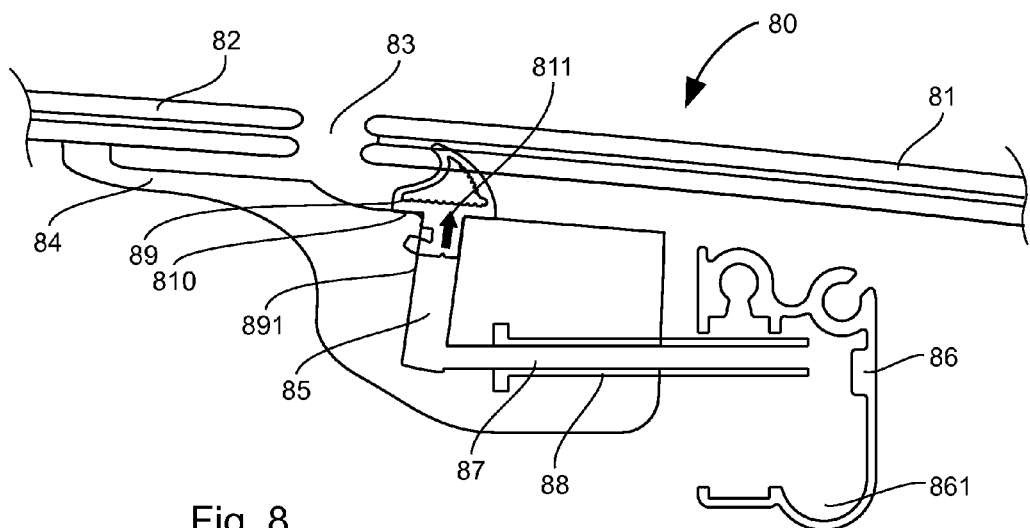
FIG. 8 is a vertical and cross-sectional view of another variant of the device shown in FIGS. 1 to 5 at the level of a front-right guiding peg.

Another variant of the embodiment of the invention presented with reference to FIGS. 1 to 5 is illustrated in FIG. 8 by a partial view in vertical and cross-section of a closing-off device 80 according to an embodiment of the invention showing a fixed part 81 and a movable panel 82 in the plane of symmetry of the front-right guiding peg 88 of the movable panel 82.

As can be seen in FIG. 8, the movable panel 82 blocks the aperture 83 formed in the plane of the fixed part 81 (closing-off position).

An elastomer seal 89 compressed at its upper lip against the face of the fixed part pointed towards the interior of the vehicle provides for tight sealing, at least partially, between the fixed part 81 and the frame 84 of the movable panel. In the closing-off position, its base 891, under the pressure of the fixed part, is pushed back into a water passage groove 85 formed in the frame 84 and communicating with a conduit 87 for draining water externally, through the peg 88, for which it blocks access from the exterior.

When the movable panel slides rearwards with respect to the vehicle and at least partially releases the aperture, the seal 89 gets decompressed. The base 891 can thus rise back in the groove 85 by effect of elasticity, in the direction indicated by the arrow 811, thus releasing a passage 810 beneath the seal 89, enabling water deposited on the external face of the movable panel to be drained frontwards or rearwards with respect to the vehicle, successively through the groove 85, the conduit 88 and the chute 861 formed in the rail 86.

3. Other Characteristics, Variants and Advantages of an Embodiment of the Invention Other variants of the embodiment of the invention described here above can be envisaged, among them:
the seal between the movable panel and the fixed part can take any appropriate shape and in particular can have several lips and/or bases;
the channel for draining water along the fixed part may be made in one or more distinct parts of the rail;
etc.

The shapes and internal and external sections of the pegs can be varied, provided that they make it possible, for the internal part, to drain water and for the external part to efficiently guide the movable panel.

Furthermore, in certain embodiments, the function of guiding and draining water can be disconnected. In this case, pegs provide for the sliding guidance and if necessary for the swaying, and distinct water passages provide for the draining of the water. These water passages are formed in the movable panel or fixedly joined to it. They extend from a lateral edge of the movable panel, for example substantially in parallel to the peg, and have one end opening out into or above one of the rails, in which water flowing in the water passage is collected.

Such a water passage can take the form of a tubular element (with or without a circular section) or an open element forming a gutter (for example with the section defining an arc of a circle or an arc of an ellipse). It can be flexible or rigid, and if necessary may be formed directly in the mass of the frame of the fixed panel.

In one embodiment complementary to the mode of making presented here above, it can also be planned that an embodiment of the invention, or at least certain aspects of the device according to an embodiment of the invention, will be implemented to close off a substantially horizontal surface of the vehicle other than its roof.

At least one particular embodiment of the disclosure thus provides a technique for closing off a horizontal opening prepared in the body of a vehicle, and provided with an aperture capable of being released in a movable glazed panel, that enables a draining of water deposited on the external surface that is efficient, whatever the opening positions occupied by the movable glazed panel.

At least one particular embodiment provides a technique of this kind that is simple to implement.

At least one particular embodiment provides a technique of this kind that enables a maximized aperture.

At least one particular embodiment reduces or eliminates, if not the presence, at least the visual appearance of a break that is formed by the offset movable window glass or glazed panel so that it is perceived as being a transparent portion having no discontinuity with the body.

At least one particular embodiment provides a technique of this kind that does not reduce or only slightly reduces the window surface allowing light transmission.

At least one particular embodiment provides a technique of this kind that simplifies the manufacture and mounting of a roof on a roof opening or bay and therefore greatly reduces the corresponding costs.

At least one particular embodiment provides a technique of this kind enabling a replacement of a fixed window glass mounted in an opening of the vehicle by a closing-off device according to the invention, without any particular adaptation to the opening and more generally to the vehicle.

The invention claimed is:

1. A device for closing off an opening prepared in a roof of a motor vehicle, comprising:
   a glazed fixed part configured to be fixedly joined with said vehicle;
   at least one glazed panel that is movable relative to the fixed part between a closing-off position, in which the glazed panel closes off an aperture defined in said fixed part, and at least one opening position, in which said aperture is at least partially released, each of said at least one glazed panel being guided slidingly along a plurality of rails fixedly joined to the surface of said fixed part; and
   at least one passage configured to recover and/or drain at least a portion of the water received on an external surface of said movable panel towards an exterior of said vehicle, said passage being formed from one side to another side of a guiding peg of said movable panel in one of said rails, to enable passage of said water from said movable panel towards one of said rails.

2. The device according to claim 1, wherein said movable panel has a frame configured to enable the flow by gravity of at least one portion of said water towards said passage.

3. The device according to claim 1, wherein said rail has means for guiding water towards at least one of its ends at the front or at the rear of said vehicle.

4. The device according to claim 3, wherein said water-guiding means comprise a draining channel formed in a portion of said rail.

5. The device according to claim 1, wherein the device furthermore includes means for closing off at least one access to said passage in said closing-off position, configured so as to prevent said passage from receiving water in said closing-off position.

6. The device according to claim 5, wherein said means for closing-off are formed by means for making said aperture tightly sealed when said movable panel is in said closing-off position.

7. The device according to claim 6, wherein said means for making said aperture tightly sealed comprise at least one seal mounted so as to be compressed against a face, pointed towards an interior of the vehicle, of said fixed part in the closed-off position, said at least one access to said passage comprising at least one water passage formed in a frame of said movable panel, plugged by said seal when said seal is compressed.

8. The device according to claim 5, wherein said at least one passage comprises at least one chute element formed by and/or fixedly joined to a frame of said movable panel.

9. The device according to claim 8, wherein said chute element at least partially encroaches into an interior space of said vehicle facing said fixed part.

10. The device according to claim 8, wherein said chute element includes a gutter adjacent to the means for closing-off and connected to at least one passage of water prepared through said movable panel.

11. The device according to claim 1, wherein said movable panel has a rounded shape in at least two horizontal directions so as to make said water stream down towards at least one of the panel's edges.

12. A motor vehicle comprising:
   a roof:
   at least one aperture prepared in a bodywork of the roof;
   at least one device for closing off the aperture prepared in the roof, which is fixed so as to be flush with said bodywork to close off said aperture, wherein the at least one device comprises:
   a glazed fixed part configured to be fixedly joined with said vehicle;
   at least one glazed panel that is movable relative to the fixed part between a closing-off position, in which the glazed panel closes off an aperture defined in said fixed part, and at least one opening position, in which said aperture is at least partially released, said at least one glazed panel being guided slidingly along a plurality of rails fixedly joined to the surface of said fixed part; and
   at least one passage configured to recover and/or drain at least a portion of the water received on an external surface of said movable panel towards an exterior of said vehicle, said passage being formed from one side to another side of a guiding peg of said movable panel in one of said rails, to enable passage of said water from said movable panel towards one of said rails.

* * * * *